Patented Apr. 4, 1939

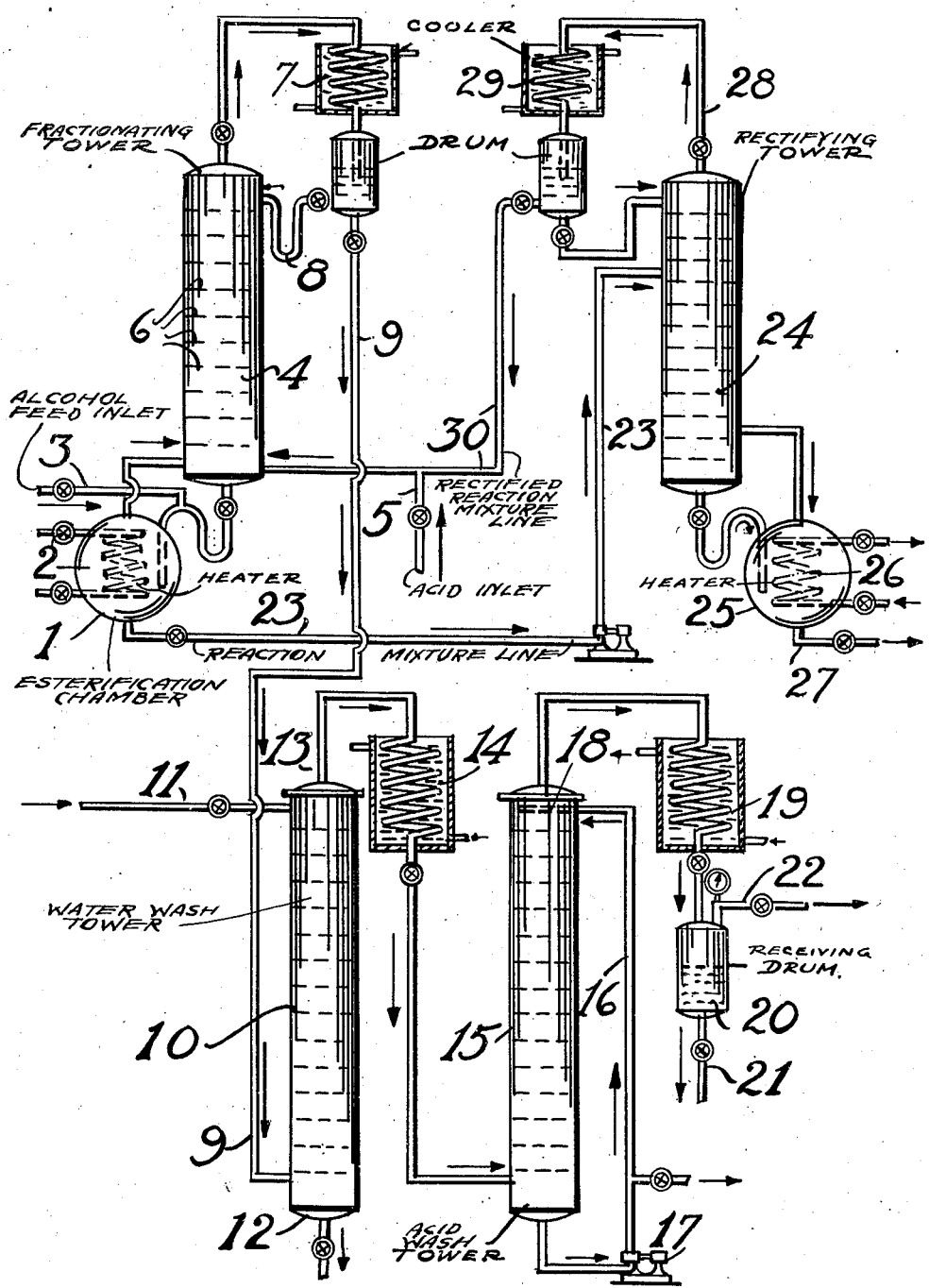

2,153,170

UNITED STATES PATENT OFFICE 2,153,170

PROCESS FOR PRODUCING ALKYL HALIDES

Hyym E. Buc, Roselle, and Anthony H. Gleason, Elizabeth, N. J., assignors to Standard Oil Development Company, a corporation of Delaware Application August 22, 1936, Serial No. 97,328

12 Claims. (Cl. 260—657)

The present invention relates to an improved process for producing alkyl halides, especially the volatile halides, containing 1 to 5 carbon atoms. The process will be clearly understood from the description and the drawing.

The drawing is a diagrammatic view in elevation of an apparatus adapted to produce volatile halides, especially ethyl and methyl chlorides, by the action of the corresponding alcohols with hydrochloric acid.

Alkyl halides, especially those of the low molecular weight alcohols from methyl to amyl inclusive, are quite desirable for various purposes and there is considerable demand for such products. The present known processes require the action of catalytic agents or must be operated at relatively high pressures. The present process has as its chief advantage, the fact that no catalytic agent is necessary, and that the process may be operated with good yields and capacity at low pressure, but it will be understood that moderate or high pressures may be used and catalysts may be employed, if desired.

Referring to the diagram, numeral 1 denotes a reaction vessel or drum, heated by a closed steam coil, 2. Alcohol is fed continuously or at intervals into the drum by means of a feed line, 3. The particular alcohol used of course depends on the particular halide required, but as ethyl chloride is the product most in demand the following description will be limited to the use of the production of ethyl chloride although it will be understood that other halides may be prepared by the same method. In this instance, ethyl alcohol will be fed into the reaction drum by means of the line 3.

A fractionating and reaction column 4 is mounted on the top of the reaction vessel 1, and hydrogen halide, hydrogen chloride for example, is fed into the bottom of this tower by the line 5. Aqueous hydrochloric acid may of course be used, but it is preferred to use the dry gaseous halide so as to reduce the amount of water that must be eliminated in the fractionation equipment. Tower 4 may be filled with any suitable packing material or fractionation plates, as indicated generally at 6, and the condenser 7 for cooling and condensing the overhead product is also provided.

In the case where ethyl chloride is manufactured the reaction vessel is held at a temperature of about 96° C. when under atmospheric pressure, and the condenser at the upper end of the tower will be held at low temperature, say, about 6 or 7° C., so as to condense all but traces of the alcohol. If methyl alcohol were substituted for ethyl in producing methyl chloride, a lower temperature would be used in the reaction vessel and a somewhat lower temperature at the still head. Likewise, with other halides, for example, propyl, butyl, and amyl, the corresponding temperatures would be slightly higher. If a higher pressure is used in order to increase the rate of reaction, the temperatures will also be increased in proportion over that used for atmospheric pressure. In any case, the top of tower 4 is maintained at a temperature adjusted so as to provide for refluxing of substantially all of the alcohol reaching the top of the tower, and in the instant case where ethyl chloride is manufactured, the material leaving the top of the tower will comprise a mixture of ethyl chloride, a small amount of ethyl ether and traces of ethyl alcohol. A portion of the condensate produced in the condenser 7 is returned to the tower by pipe 8 for reflux and for maintaining the temperature, while the equipment flows through pipe 9 to the purifying equipment.

It will be understood that the purifying equipment is not necessary if the operator is satisfied with a relatively impure product containing ether and traces of alcohol, but where a better grade of product is desired, purification equipment should be used. The purification apparatus consists of a series of towers. In the first tower, 10, the condensed product having been allowed to vaporize is washed with water. The water enters at the top of tower 10 by pipe 11 and is removed at the bottom by pipe 12. Ethyl chloride with some impurities leaves the tower by vapor line 13 and is conducted to a second purifying tower 15 after cooling in the cooler 14. Tower 15 is fed with strong sulfuric acid which is circulated through pipe 16 and by pump 17. The temperature in this tower is quite low, for example, it should be preferably below about 30 or 35° C., and in the tower the last traces of alcohol and ether are removed. Vapors leaving tower 15 by pipe 18 are conducted to a final condenser 19 which must be cooled with brine or ammonia so as to liquefy the ethyl chloride. The product is collected in the separator 20 from which liquefied ethyl chloride is withdrawn by pipe 21, from which residual gas is removed by pipe 22.

Returning now to reactor 1, it has been found that as the process continues water accumulates, with the result that the hydrochloric acid concentration diminishes and reaction rate continually decreases. This is remedied by continuously or from time to time withdrawing the liquor from the reactor 1 by a pipe 23 and this is fed to the midsection of a fractionation tower 24. The tower is mounted on a still 25 which is heated by steam coil 26. The residual product, comprising dilute hydrochloric acid is removed by pipe 27 and may be recovered in any suitable equipment not shown. The distilled product consists of alcohol, hydrogen chloride, and a smaller amount of water, and is removed from the tower by pipe 28 and condensed in the cooler 29. A portion of this product must be returned to the tower 24 as reflux and the remainder returns to tower 4 or to the reactor 1 for reuse by means of pipe 30.

The method described above operates smoothly and effectively to produce alkyl halides of good purity and excellent yields. The method of operation will be clearly apparent from the description given above, but it may be added that as the preferred feed stock 95% alcohol is used and is fed into the reaction chamber 1. As stated before, dry hydrochloric acid gas is preferable as the halogenating agent and may be in the proportion of, say 70 to 90 parts by weight for 100 parts of alcohol. In order to secure the best operation, a relatively high reflux ratio in the tower 4 is provided, but the exact ratio will depend, of course, on the height of the tower, the capacity and other known conditions. In general, however, it is found that with the reflux ratio, say, from 10 to 1 or 20 to 1, it is possible to obtain a product of excellent purity substantially free of acid and containing only traces of alcohol. These figures for reflux apply for atmospheric pressure, but at higher pressures, due to increased reaction rate, lower ratios are quite satisfactory.

The purification process is of course not required if an impure product is satisfactory. The vapor obtained from the fractionating and reacting tower 4 is largely the alkyl halide which ordinarily contains about 5% of ether and even less alcohol. The water washing operation is ordinarily conducted at a slightly higher temperature, say about 30° C., and may be conducted in a single tower or in a series of towers. The acid washing step is ordinarily conducted at somewhat lower temperature and is primarily used to remove the ether. Other suitable purification steps may be used if desired, either in addition to or substitution for the ones disclosed.

The liquid material withdrawn from the reaction chamber consists of about 5 parts of alcohol to 13 parts of hydrochloric acid (32%) and, of course, contains water which is eliminated at this point. These proportions vary considerably, depending on the particular material produced and the relative proportions of the acid and alcohol used. In the secondary tower 24, the bulk of the alcohol and a considerable part of the acid is taken overhead and returned to the reaction chamber or to its tower. This material, although it still contains some water, contains much less than the liquid withdrawn from the reaction chamber. Ordinarily it would contain from 4.5 to 5 parts of alcohol to about 12 parts of 50% acid. The residue withdrawn from the still 25 comprises the constant boiling mixture of aqueous hydrochloric acid which contains about 20% HCl.

As mentioned before, the process is capable of operating efficiently and satisfactorily under ordinary atmospheric pressure and without the necessity of any catalytic agent. However, if desired, it may be operated at a moderate pressure of 10 to 150 lbs. per square inch or even high pressure of several hundred pounds, just so the critical temperatures of the products are not exceeded. If desired the reactor 1 may be provided with catalytic materials, among which may be mentioned the various metallic halides, zinc chloride, bismuth chloride, and the like.

As an example of the operation of the process, the reaction vessel was originally charged with 100 parts of 95% ethyl alcohol and 270 parts of 32% aqueous hydrochloric acid. The vessel was brought to the boiling point at substantially atmospheric pressure (about 96° C.) and the condenser at the top of the column held at 7° C.

When steady conditions were obtained, it was found that 20.8 parts per hour of the 95% alcohol could be continuously fed to the reactor along with 16 parts of dry HCl per hour. The reflux rate in the column was about 15 to 1 and produced about 25 parts of ethyl chloride per hour. This crude product contained about 1 part alcohol and only traces of hydrochloric acid and ether. Washing with water removed the alcohol and acid while a wash of strong sulfuric acid removed the ether.

The liquor accumulating in the reactor was continuously withdrawn. It contained slightly more water than the original charge. On reboiling, using a reflux ratio of 3 or 4 to 1, the residue was reduced to substantially 20% acid, the constant boiling mixture, while the acid and alcohol were recovered overhead and returned to the main column for further reaction. The amount of dilute (20%) acid withdrawn was about 8.75 parts.

Example 2 further illustrates the process and the effect of changing conditions. Experiments were conducted with various ratios of alcohol to acid, and the rate of ethyl chloride production was observed. In the data given in the following table, the rate is shown in terms of ethyl chloride produced per hour per litre of the reaction mixture:

| Volume percent of alcohol | Volume percent of acid (32 percent) | Rate |
|---|---|---|
|  |  | Grams |
| 50 | 50 | 23 |
| 40 | 60 | 45 |
| 37.5 | 62.5 | 56 |
| 33 | 67 | 70 |
| 30 | 70 | 95 |

It was found that if the proportion of acid was increased to above 70%, a considerable quantity of hydrochloric acid found its way into the overhead product from the tower 5.

As a third example, by increasing the pressure under which the reaction is conducted, much higher rates of reaction can be obtained. In one run under 45 pounds per square inch, using a refluxing temperature of 52° C. it was found that the rate of production was at least eight times as great as under the same conditions at normal pressure, and the actual rate is probably even greater because in the particular experiment the conditions could not be controlled as accurately as desired.

The present invention is not limited to any theory of the process nor to the production of any specific alkyl halide but only to the following claims in which it is desired to claim all novelty inherent to the invention.

We claim:

1. An improved process for producing volatile alkyl halides that comprises refluxing a mixture of a volatile alcohol and an aqueous hydrogen halide in the reaction zone, maintaining pressure and temperature conditions on the reaction zone sufficient to cause the vapors withdrawn from the reaction zone to be essentially alkyl halide and to reflux the unreacted alcohol and the aqueous hydrogen halide, removing the aqueous mixture of alcohol and hydrogen halide, rectifying the mixture so as produce a distillate containing less water and returning the distillate to the reaction zone.

2. An improved process to produce alkyl halides containing about 1 to 5 carbon atoms, comprising refluxing a mixture of an alcohol containing from 1 to 5 carbon atoms with an aqueous hydrogen halide in a reaction zone, and providing sufficient reflux to permit withdrawal of alkyl halide substantially free of alcohol and hydrogen halide, separately withdrawing an aqueous mixture of alcohol, acid and dissolved reaction products, rectifying the same to reduce the water content thereof, and returning said rectified mixture to the reaction zone.

3. A process according to claim 2, in which the process is conducted at substantially atmospheric pressure.

4. A process according to claim 2, in which the process is conducted in the absence of a catalytic agent.

5. A process to produce alkyl halides, comprising refluxing an alcohol, containing from 1 to 5 carbon atoms with hydrochloric acid under atmospheric pressure and in the absence of a catalyst, providing sufficient reflux to permit withdrawal of the alkyl halide substantially free from alcohol and acid, separately withdrawing an aqueous reaction mixture from the reaction zone and distilling the same to reduce the water content thereof and returning the partially dehydrated reaction mixture to the reaction zone.

6. A process according to claim 5, in which ethyl alcohol is used as the initial product and ethyl chloride is obtained.

7. A process according to claim 2, in which ethyl alcohol and dry hydrogen chloride gas are forced into the reaction zone and ethyl chloride is obtained as a product.

8. Process according to claim 2 in which the reaction is carried out at superatmospheric pressure.

9. An improved process for producing alkyl halides which comprises continuously feeding into a reaction zone an alcohol containing from 1 to 5 carbon atoms and a substance selected from the group consisting of a dry hydrogen halide and aqueous mixtures of hydrogen halide, continuously boiling the liquid mixture in the reaction zone, continuously drawing off from the reaction zone in vapor form a substantially large proportion of the alkyl halide formed, refluxing back into the reaction zone substantially all of the vapors having a substantially higher boiling point than the alkyl halide, continuously removing from the reaction zone a portion of the reaction liquid containing water formed by the reaction, continuously separating from said portion of the reaction liquid a partially dehydrated fraction containing substantially less water than the reaction liquid in the reaction zone and returning said fraction to the reaction zone.

10. An improved process for producing ethyl chloride which comprises refluxing a mixture of ethyl alcohol and a substance selected from the group consisting of hydrogen chloride and aqueous mixtures thereof in a reaction zone, withdrawing from said reaction zone a vapor consisting essentially of ethyl chloride, removing in liquid form from the reaction zone at least a portion of the reaction liquid containing water formed by the reaction and also containing ethyl chloride formed by the reaction as well as some unreacted ethyl alcohol and hydrochloric acid, rectifying said portion of the reaction liquid to produce a distillate containing substantially less water than the liquid subjected to rectification, and returning said distillate to the reaction zone.

11. An improved process for producing ethyl chloride which comprises refluxing in a reaction zone about 100 parts by weight of ethyl alcohol and a substance selected from the group consisting of hydrogen chloride and aqueous mixtures thereof, the hydrogen chloride content being about 70 to 90 parts by weight, maintaining the reflux condenser at a sufficiently low temperature to reflux back into the reaction zone substantially all of the ethyl alcohol, water, and hydrochloric acid present in the vapors but permitting the ethyl chloride vapors to be withdrawn in vapor form, removing in liquid form from the reaction zone a portion of the reaction liquid containing in addition to some ethyl chloride and unreacted alcohol also some hydrochloric acid of about 32% concentration, rectifying said withdrawn portion of the reaction liquid into a distillate fraction containing hydrochloric acid of about 50% concentration and a rectification residue containing dilute aqueous hydrochloric acid of about 20% concentration, and returning the distillate fraction to the reaction zone.

12. Process according to claim 11 carried out at a superatmospheric pressure of about 10 to 150 lbs. per square inch.

HYYM E. BUC.
ANTHONY H. GLEASON.